United States Patent Office 3,169,079
Patented Feb. 9, 1965

3,169,079
PROCESS FOR PRODUCING A POLYMER COATING
Thomas E. Ferington and Rajendra N. Chadha, Silver Spring, Md., assignors to W. R. Grace & Co., New York, N.Y., a corporation of Connecticut
No Drawing. Filed July 5, 1963, Ser. No. 293,204
8 Claims. (Cl. 117—124)

The present invention relates to an improvement in vinyl monomer polymerization. More particularly it is directed to a process improvement whereby the yield of vinyl polymer in film or coating form is increased.

In an application having Serial Number 245,974, filed December 20, 1962, now abandoned, and assigned to the same assignee, there is disclosed a process of forming films or coatings from non-gaseous vinyl monomers, particularly esters of acrylic acid, which comprises exposing a mixture of said vinyl monomers and a catalytic amount of an aluminum alkyl compound to a free oxygen containing gas (e.g. air). Although the reaction rate is rapid, the polymer yield is low.

Surprisingly it has now been found that increased yields can be obtained in the polymerization of a film or coating of a non-gaseous vinyl monomer on exposure of a mixture of said vinyl monomer and a catalytic amount of an aluminum compound to a free oxygen-containing gas, e.g. air, by the improvement of forming an oxygen barrier for said film or coating.

In the polymerization reaction herein it has been found that although oxygen is needed for initiation of the polymerization, an excess of oxygen causes premature termination of the polymerization thus reducing yields. To overcome this problem an oxygen barrier is employed to shield the polymerizing film or coating from unlimited contact with oxygen. The oxygen barrier may be in the form of a solid, liquid or gas as will be shown by examples hereinafter.

The gaseous oxygen barrier can be nitrogen, carbon dioxide or any of the noble gases e.g. argon. The liquid oxygen barrier can be any hydrocarbon which evaporates slowly at atmospheric conditions of temperature and pressure and does not react with the aluminum alkyl compound. Examples of said hydrocarbons include but are not limited to hexane, heptane, cyclohexane decahydronaphthalene, benzene, toluene and the like. A solid oxygen barrier can be provided by mica, wax and the like. In fact after initiation of the polymerization in oxygen, any fine powder which does not react with the aluminum alkyl compound can be used as an effective solid oxygen barrier. In addition the oxygen barrier may be formed in situ or added subsequent to initiation of the polymerization reaction by exposure to an oxygen containing gas. This latter method is exemplified by exposing the system to free oxygen e.g. air and then removing the system to or blanketing the system with an oxygen free atmosphere such as nitrogen.

The term "nongaseous" used in conjunction with the vinyl monomers herein means that the monomer is not a gas under atmospheric conditions of temperature and pressure. Thus the vinyl monomers are either liquid or solid. The term "vinyl monomers" herein means compounds of the formula

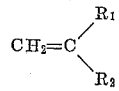

wherein $R_1$ is hydrogen or an organic radical and $R_2$ is an organic radical. The vinyl monomers are well-known in the art and include such material as acrylic acid esters, vinyl esters, allyl esters, vinyl nitriles, vinyl ethers and the like. Among the suitable acrylic acid esters which may be employed in the present invention are: methyl acrylate; ethyl acrylate; n-propyl acrylate; isopropyl acrylate; n-butyl acrylate; isobutyl acrylate; sec-butyl acrylate; tert-butyl acrylate; n-pentyl acrylate; n-hexyl acrylate; 2-ethylbutyl acrylate; 2-ethylhexyl acrylate; n-heptyl acrylate; n-octyl acrylate; 3,5,5-trimethylhexyl acrylate; octadecyl acrylate; cyclopentyl acrylate; cyclohexyl acrylate; abitol acrylate (mixed monomers); n-decyl acrylate; tridecyl acrylate; 3,3,5-trimethylcyclohexyl acrylate; 2-n-butoxyethyl acrylate; 2-ethoxyethyl acrylate; 3-ethoxypropyl acrylate; 3-methoxybutyl acrylate; 2-methoxyethyl acrylate; benzyl acrylate; 2-phenoxyethyl acrylate; phenyl acrylate; 2-phenylethyl acrylate; 2-bromoethyl acrylate; 2-chloroethoxyethyl acrylate; 2-chloroethyl acrylate; 2,2,2-trifluoroethyl acrylate; N,N-diethylaminoethyl acrylate; 1,1-dihydroheptafluorobutyl acrylate, N,N-dimethylaminoethyl acrylate; 2-N-morpholinoethyl acrylate and tetrahydrofurfuryl acrylate.

Other suitable vinyl monomers include: abitol methacrylate; acrylamide; acrylonitrile; acrylyl chloride; allyl acetic acid; allylidene diacetate; allyl acetate; N-allyl acrylamide; allyl beta-allyloxypropionate; allylamine; N-allyl aniline; allyl anthranilate; allylbenzene; allyl benzoate; allyl bromide; allyl n-butyrate; allyl carbamate; allyl chloride; allyl choroacetate; allyl cinnamate; allyl crotonate; allyl cyanide; allyl ether; allyl 2-ethylbutyrate; allyl ethyl ether; allyl glycol ether; allyl n-heptanoate; allyl hexoate; allyl n-hexyl ether; allyl isocyanate; allyl laurate; allyl methacrylamide; allyl methacrylate; allyl myristate; allyl octanoate; allyl palmitate; allyl pelargonate; allyl phenoxyacetate; allyl phenyl acetate; allyl phenyl ether; allyl propionate; allyl stearate; allyl trifluoroacetate; allylurea; allyl n-valerate; allyl iso-valerate; n-amyl methacrylate; iso-amyl methacrylate; benzyl methacrylate; 2-bromoethyl methacrylate; 2,2-butoxyethyl methacrylate; N-tert-butylacrylamide; sec-butyl methacrylate; iso-butyl methacrylate; tert-butyl methacrylate; 2-chloroethyl methacrylate; N - (para - chlorophenyl)-acrylamide; N-(para-chloro-phenyl)-methacrylamide; 2-chlorostyrene; 3-chlorostyrene; 4-chlorostyrene; cinnamyl methacrylate; beta - cyanoethyl methacrylate; cyclohexyl methacrylate; cyclopentyl methacrylate; 9-decenyl isocyanate; n-decyl methacrylate; N,N-diallylacrylamide; diallyl adipate; di-glycolate; diallyl malonate; N,N-diallyl methacrylamide; diallyl phthalate; 2,5-dichlorostyrene; N,N-diethylacrylamide; N,N-diethylaminoethyl methacrylate; 1,1-dihydroheptafluorobutyl methacrylate; N,N-dimethylallylamine; N,N - dimethylaminoethyl methacrylate; 2-ethoxyethyl methacrylate; ethylene dimethacrylate; 2-ethylhexoxyethyl methacrylate; 2-ethylhexyl methacrylate; ethyl methacrylate; furfuryl methacrylate; n-heptyl methacrylate; n-hexyl methacrylate; n-lauryl methacrylate; lauryl methacrylate; methacrylamide; methallyl chloride; 3-methoxybutyl methacrylate; 2-methoxyethyl methacrylate; methyl methacrylate; alpha - methylstyrene; N-(beta-naphthyl) methacrylamide; octadecyl methacrylate; iso-propyl methacrylate; styrene; tetraethyleneglycol dimethacrylate; 3,3,5-trimethylcyclohexyl methacrylate; 3,5,5-trimethylhexyl methacrylate; vinyl acetate; vinyl n-butyl ether; vinyl isobutyl ether; vinyl butyrate; vinyl 2-chloroethyl ether; vinyl isobutyl ether; vinyl butyrate; vinyl 2-chloroethyl ether; vinyl n-decanoate; vinyl ethylether; vinyl 2-ethylhexoate; vinyl 2-ethylhexyl ether; vinyl iodide; vinyl laurate; vinyl methacrylate; vinyl 2-methoxyethyl ether; vinyl n-octanoate; vinyl oleate; vinyl phenylacetate; vinyl propionate and vinyl stearate. The monomers may be used individually or in various combinations. Many others are known in the art and may likewise be used.

By the term "aluminum alkyl compounds" as used throughout this invention is meant a compound having the general formula:

in which R is alkyl (e.g., methyl, ethyl, propyl, isopropyl, buty, isobutyl, etc., including octyl, dodecyl, and so on); R' is H, Cl, or alkyl; and R" is either H or alkyl; provided that when R' is Cl, R" is alkyl. Among the various aluminum alkyl compounds which may be employed are triethyl aluminum; triethyl aluminum/diethyl aluminum hydride mixture; triisobutyl aluminum; trimethyl aluminum; diethyl aluminum chloride; trioctyl aluminum; tri-n-butyl aluminum; triisopropyl aluminum; tridodecyl aluminum; diethyl methyl aluminum; diethyl isobutyl aluminum; diisobutyl ethyl aluminum; diethyl aluminum bromide; dioctyl aluminum chloride; didodecyl aluminum chloride; diethyl aluminum hydride; diisobutyl aluminum hydride; dioctyl aluminum hydride and the like. The alkyl aluminum compounds may be employed individually or in various mixtures.

In practicing this invention the aluminum alkyl compound in the catalyst is preferably used in complex form to polymerize the vinyl monomers of the instant invention. The aluminum alkyl compound can be complexed with saturated or unsaturated esters of monocarboxylic acid, said acid having 1–20 carbon atoms. Examples of these complexing esters include, but are not limited to, ethyl acetate, ethyl propionate, vinyl propionate, vinyl acetate, ethyl acrylate, n-butyl acrylate, t-butyl acrylate, methyl methacrylate and the like. The complex can be made by preforming with efficient cooling, a mixture of the aluminum alkyl compound with the aforesaid saturated or unsaturated monocarboxylic esters in a mole ration of 1:1 and thereafter adding said complex to the monomer mixture. The use of the aluminum alkyl in complex form as a catalyst component decreases the exotherm of the reaction which occurs when the aluminum alkyl compound is mixed with the major portion of the monomer reactant and thus allows for better temperature control. Hence, although the aluminum alkyl compound is operable without complexing when temperature control is maintained, it is preferable to employ said compound in a complexed form in the present invention.

The amount of aluminum alkyl is not critical. As little as 0.01 weight percent (on the total amount of solution) is operable, and as much as 25% can be used. Amounts of the lower aluminum alkyls in excess of 25% are hazardous to use because of the inflammability of the aluminum alkyl at such concentrations. Even concentrations of the lower alkyls in the range of 10–25%, though operable, have a tendency to smoke. Expressed in mole percents, aluminum alkyl concentrations of 0.005–25 mole percent (of the monomer) are generally operable, the range of 0.01–10 mole percent being preferred. Even smaller amounts than 0.005 mole percent are operable, but are not recommended because the polymerization rate may be slowed to the point where a material part of the monomer, if volatile (e.g., vinyl acetate), may be lost by evaporation during the polymerization of the monomer into a film.

Also included within the scope of this invention is the addition to the monomer mixture of fillers, dyes and pigments which do not react with the monomer mixture prior to exposing it to a free oxygen containing gas. Selection of well known fillers, dyes and pigments would be obvious to one skilled in the art. In addition additives such as maleic anhydride or substituted maleic anhydride e.g. dichloromaleic anhydride, added in amounts of 0.5 to 5% by weight based on the weight of the vinyl monomer, preferably 1.0 to 2.0% by weight, is added to the monomer mixture to increase the storage life of the mixture. Another additive, used to increase the yield of the polymer, is acrylic acid added to the vinyl monomer mixture in amounts of 0.5 to 5.0% by weight of the vinyl monomer.

The following examples are supplied to illustrate the invention and are not intended to limit it in any manner. All parts and percentages in the examples herein are by weight unless otherwise indicated.

EXAMPLE 1

6.3 ml. of pure diisobutyl aluminum hydride were charged to a deoxygenated serum-stoppered test tube placed in a Dry Ice-heptane cooling bath at minus 65–75° C. A nitrogen stream was continued through the tube while 5.0 ml. of deoxygenated n-butyl acrylate was added thereto. The tube was removed from the bath still under a nitrogen blanket, and allowed to warm to room temperature with gentle shaking. The thus formed diisobutyl aluminum hydride:butyl acrylate complex had a mole ratio of 1:1 respectively. The complex was stored under $N_2$ until used in subsequent examples herein.

EXAMPLE 2

*Control run*

2.0 parts maleic anhydride were charged to a test tube. The tube was rubber-stoppered and deoxygenated by passing nitrogen through the tube via an inlet and outlet in the rubber stopper. 76.5 parts n-butyl acrylate was added through the rubber stopper by means of a deoxygenated hypodermic syringe, followed by the addition in the same manner of 1.5 parts acrylic acid and 10 parts of complexed aluminum alkyl compound from Example 1. The mixture was gently shaken to obtain homogenity and ½ ml. of the mixture was removed from the tube by a deoxygenated syringe and spread on a preweighed glass plate in air at room temperature (25° C.) to a coating thickness of about 2 mils. Polymerization occurred immediately and a firm coating formed. After 10 minutes the run was discontinued and the product was dried to constant weight. The conversion of n-butyl acrylate to polymer was 32%.

EXAMPLE 3

Example 2 was repeated except that 2.5 parts of paraffin wax was added to the mixture before the ½ ml. sample was removed therefrom. On exposing the coating to air the rapid polymerization forced most of the wax up out of the polymer and the wax thereby forms a layer on top of the polymer which layer limits the amount of oxygen which is able to come in contact with the growing polymer. This was readily apparent from the feel of the coating which was waxy to the touch and could be scraped off with a fingernail as compared to the firm polymer coating surface in Example 2. Underneath the waxy layer the polymer surface was firm. The percent conversion of n-butyl acrylate to polymer was 37%.

This example was repeated using 76.5 parts of tert. butyl acrylate instead of n-butyl acrylate and resulted in a 41% conversion to polymer. The control run for tert. butyl acrylate as in Example 2 resulted in a 33% conversion to polymer.

This example was repeated using 76.5 parts of ethyl acrylate instead of n-butyl acrylate. The percent conversion to ethyl acrylate polymer was 35% as compared to a 28% conversion in the control run as in Example 2.

EXAMPLE 4

Example 2 was repeated except that 10 parts of mica powder (minus 350 mesh) was added to the mixture before the ½ ml. sample was removed.

The mica tended to come to the surface and lined up parallel to it thereby limiting contact of oxygen and the growing polymer. The percent conversion of n-butyl acrylate to polymer was 39%.

EXAMPLE 5

Example 2 was repeated except that 10 parts of heptane was added to the mixture prior to removal of the ½ ml. sample. The heptane was exuded to the surface of the coating and formed an oxygen barrier thereat before evaporating. After drying to constant weight, the percent conversion of n-butyl acrylate to acrylate to polymer was 38%.

The following examples in Table I show the effect on percent conversion of adding an oxygen barrier at various time intervals after initiation of the polymerization in air. In all examples the admixture proceeding was as in Example 2, using 86.3 parts n-butyl acrylate, 1.48 parts acrylic acid, 2.16 parts maleic anhydride and 10 parts of complexed aluminum alkyl compound from Example 1. After the deoxygenated mixture was spread on a preweighed glass plate in air at room temperature (25° C.) and polymerization was allowed to continue for varying periods, an oxygen barrier for the plate and vinyl monomer coating was then formed by blanketing the plate and coating with either deoxygenated n-heptane or nitrogen.

TABLE I

| Example No. | Time mixture exposed to oxygen (mins.) | Type Oxygen Barrier | Percent Conversion to Polymer |
|---|---|---|---|
| 6 | 0.08 | n-Heptane | 33.6 |
| 7 | 0.25 | do | 51.7 |
| 8 | 0.50 | do | 48.0 |
| 9 | 1.00 | do | 53.0 |
| 10 | 2.00 | do | 51.0 |
| 11 | 10.00 | do | 40.5 |
| 12 | 0.50 | Nitrogen | 67.0 |
| 13 | 1.0 | do | 64.0 |
| 14 | 2.0 | do | 39.0 |
| 15 | 4.0 | do | 43.0 |
| 16 | 10.0 | do | 40.0 |
| 17 | 30.0 | do | 39.0 |

As can be seen from the examples in the table the oxygen barrier has no effect when it is added after about 10 minutes and in effect Examples 11, 16 and 17 are equivalent of blank runs. The highest yields occur on exposing the mixture for about 0.5 minute to oxygen and then forming an oxygen barrier.

The vinyl polymers obtained by the practice of this invention have many and varied uses. For example the polymers of the esters of acrylic acid can be used for paper, metal or wood coatings and films.

We claim:
1. In a process for forming a polymer coating of a non-gaseous ester of acrylic acid which comprises coating a substrate with a polymerizable mixture consisting essentially of an ester of acrylic acid and 0.005–25 mole percent of the ester of acrylic acid of an aluminum alkyl compound, said aluminum alkyl compound being complexed in a 1:1 mole ratio with an ester of a mono-carboxylic acid, said acid containing 1–20 carbon atoms in a free oxygen containing gas, the improvement whereby yields are increased which comprises:
    (a) initiating the polymerization by exposing the polymerizable mixture to oxygen, and thereafter
    (b) before the polymerization is complete, excluding oxygen from the polymerizable mixture and
    (c) permitting the polymerization to proceed to completion in the absence of oxygen.
2. The process according to claim 1 wherein oxygen is excluded by forming an oxygen barrier in situ in the polymerizable mixture, said oxygen barrier consisting essentially of an inert oxygen-impermeable material.
3. The process according to claim 2 wherein the oxygen barrier is formed by the action of the said material migrating to the surface of the polymerizable mixture.
4. The process according to claim 3 in which the said material is finely divided mica.
5. The process according to claim 3 in which the said material is wax.
6. The process according to claim 1 in which oxygen is excluded from the polymerizable mixture by blanketing the polymerizable mixture with an inert atmosphere.
7. The process according to claim 6 in which the atmosphere is $N_2$.
8. The process according to claim 6 in which the atmosphere is n-heptane.

References Cited by the Examiner
UNITED STATES PATENTS
3,051,585  8/62  Weinberg et al. _____ 117—161
3,117,112  1/64  Mirabile et al. _____ 260—89.5

JOSEPH L. SCHOPER, Primary Examiner.
DONALD E. CZAJA, Examiner.